Feb. 17, 1953
T. A. D. JONES ET AL
2,628,552
MEAT CURING DEVICE
Filed Dec. 8, 1951
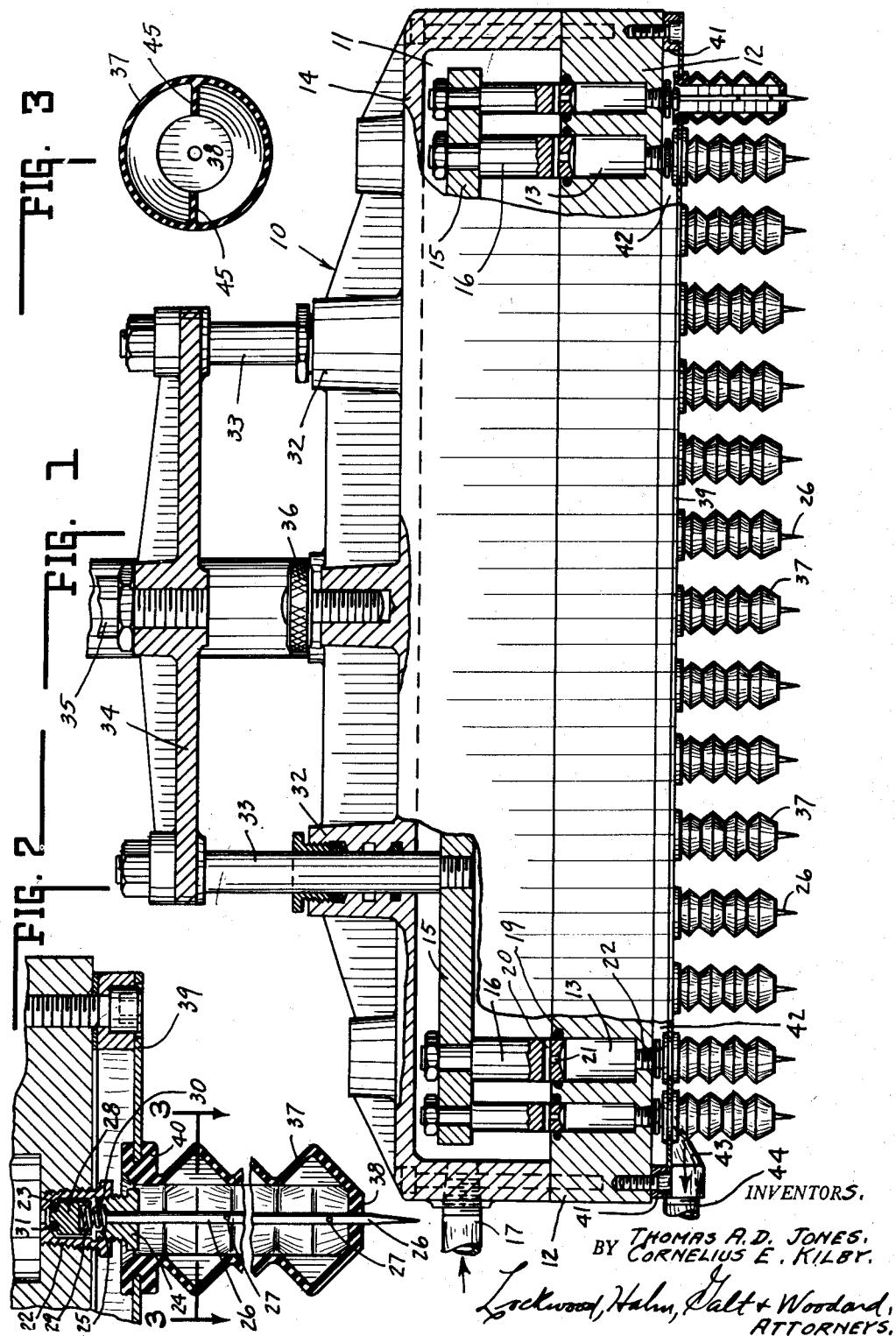
INVENTORS.
BY THOMAS A. D. JONES,
CORNELIUS E. KILBY.
Lockwood, Hahn, Galt & Woodard,
ATTORNEYS.

Patented Feb. 17, 1953

2,628,552

UNITED STATES PATENT OFFICE 2,628,552

MEAT CURING DEVICE

Thomas A. D. Jones and Cornelius E. Kilby, Indianapolis, Ind., assignors to Kingan & Co., Incorporated, Indianapolis, Ind., a corporation Application December 8, 1951, Serial No. 260,716

4 Claims. (Cl. 99—257)

The present invention relates to an improvement in meat curing devices of that character injecting a curing pickle brine into a slab of meat to be cured, such as a side of bacon or the like.

In that type of apparatus wherein there is provided one or more hollow injecting needles having discharge openings in the side walls thereof at spaced intervals along the length thereof, it has been found that there is considerable waste of the curing fluid. One reason for this is that the thickness of the slab of meat varies and as a result there are occasions when the needle does not penetrate to a point where all the openings in the needle are covered by the meat. As a result, when the curing liquid is forced through the needle to cause it to penetrate the meat, those openings not covered by the meat become escape ports through which the liquid will escape and flow off to the floor and into the drains.

Furthermore, there may be times when in the event a plurality of needles are used, the area of the meat to be cured is not sufficient to receive all of the needles, and as a result there is an escape of the liquid through the openings of those needles which have not been projected into the meat.

It is one of the objects of the present invention to provide means for preventing the waste of this material.

A further object of the invention is to provide a surrounding casing for the needle or needles having sealing engagement therewith beyond the opening nearest the point, which casing is retractable along the length of the needle to expose the openings of that portion penetrating the meat while enclosing the other openings so that the liquid escaping therefrom will flow into the casing to be reclaimed.

Another object of the invention is to so construct and arrange the surrounding casing that it will act as a stripper means to assist in stripping the meat from the needles as the needles are withdrawn from the meat.

Further objects and advantages of the invention will appear more fully hereinafter in the specification and appended claims.

Our invention is particularly applicable to that type of apparatus described and claimed in the co-pending application of Alfred C. Gannon, Cornelius E. Kilby and Virgil R. Rupp filed October 7, 1949, Serial No. 120,178, for Meat Curing Device.

For the purpose of disclosing the invention we have illustrated an embodiment thereof in which Fig. 1 is the side elevation of a pickling apparatus embodying our invention, certain parts being broken away.

Fig. 2 is a detail section showing more particularly the needle enclosing casing and Fig. 3 is a transverse section on the line 3—3 of Fig. 2.

In the structure illustrated there is shown a header 10 having a pickle brine containing reservoir 11. This header includes a bottom casting 12 formed with a series of cylinders 13. Secured over the bottom casting and sealed thereon is a cover casting 14 enclosing the reservoir. Movable within the reservoir is a plunger plate 15 to which are secured a series of plungers 16. Each plunger is aligned with and extends into one of the cylinders 13 for reciprocable movement therein. Brine is introduced into the reservoir 11 through an inlet connection 17 flowing through the reservoir and through an outlet (not shown) in the top of the cover member 14.

The flow of brine is preferably from a pump or suitable overhead container remaining open to the reservoir 11 so that it is continually filled, and no air is permitted to enter. Each of the pistons 16 is arranged so that its lower tip extends into the cylinder 13 at all times, being surrounded by a packing ring 19 carried in an annular groove in the cylinder wall. Each piston has a transverses bore 20 communicating with a centrally disposed port 21. The bore is located in the extreme end portion of the piston for communication with the reservoir 11 when the piston reaches the end of its retracted or suction stroke. At the beginning of the pressure stroke, however, it will be sealed by the cylinder wall and the packing rings.

At the lower end of each cylinder there is provided a nipple 22 in turn beveled as at 23 at its upper end. Threaded into the lower end of this nipple is a needle head 24 having a pocket 25 formed therein. The needle 26 is secured to the head to extend downwardly therefrom. This needle is hollow and closed at its lower end and is provided along its length with a plurality of discharge openings 27. Slideably mounted within the nipple 22 between the needle head 24 and the beveled end 23 of the bevel there is a vacuum check valve 28 having a pocket 29 in alignment with the pocket 25 to receive a compression spring 30 urging the valve upwardly into sealing engagement with the bevel end 23 of the nipple. This valve 28 is formed with a conical head portion conforming to the end portion 23 and is surrounded by a sealing ring 31.

The body of the valve 28 is out of round, being formed of a series of flats to thereby provide passages past the valve when the sealing ring 31 is unseated from the conical end of the nipple.

The cover casting 14 is provided with suitable reinforcing struts, each having a boss 32 in which there are provided suitable bearings which are adapted to receive sliding connecting rods 33, the lower end of each of which is secured to the plunger plate 15 for connecting the upper end thereof to a pressure head 34. The pressure head is actuated by a piston rod 35 extending into a hydraulic cylinder (not shown). Through the operation of the hydraulic cylinder the head 34 and the plunger plate 15 with its battery of plungers may be vertically reciprocated within the header 10. To adjustably limit the extent of the stroke and thereby control the quantity of pickling brine discharged into the meat, there is provided a stop screw 36 with which the pressure head 34 may engage to limit its downward stroke.

In the operation of the structure so far described, the side of bacon or other meat to be cured may be placed upon a suitable table or platform adapted to be raised relative to the header and its needles until the needles extend therein to within a short distance from the far side.

At the beginning of the injecting cycle the plungers are at their lowermost position. Upon the meat being penetrated by the needles, the plungers are elevated, springs 30 sealing the vacuum check valve 28. The suction stroke of the plungers thereby creates a vacuum due to the sealing action of the rings 19 and upon the bores 20 of the plungers passing above the cylinders, the vacuum is thereby broken, and the pickling brine within the reservoir is sucked in through the ports 21 filling the cylinders.

As the plate 15 is moved downwardly with the plungers 16, the bores 20 pass the sealing rings 19 and the brine trapped in the cylinders is forced downwardly through the discharge apertures 27 of the needles. Upon completion of this cycle of operation, the plungers remain in their lowered position until the next injecting operation. The supporting plate or platform for the meat is then lowered and the needles are thereby withdrawn from the meat.

It sometimes happens that those apertures 27 near the top of the needles are not covered due to the fact that the needles do not project far enough into the meat. Accordingly, in order to prevent the brine which is being forced through the needles from escaping through these exposed apertures and thereby becoming wasted, each needle is provided with a closing casing. This casing takes the form of a flexible bellows 37, which may be made of rubber, and has its lower end 38 sealingly embracing thhe needle. When the bellows is fully extended, the lower end 38 of the bellows sealingly engages the needle below the side discharge aperture more nearly adjacent the point of the needle. The upper end of each bellows extends through an opening in a reservoir plate 39 and is provided with a flange 40 grooved to sealingly receive the side walls of the opening in the plate 39. This plate 39 is secured to the under face of the bottom casting 12, being spaced apart therefrom and having interposed therebetween suitable spacing bars 41 on all four sides at the edges so that there is formed between the bottom face of the casting 12 and the plate 39 a reservoir 42 into which the brine flowing into the casings 37 may overflow. At one end of this reservoir there is provided a takeout port 43 communicating by the conduit 44 with a suitable pump by which the brine in the reservoir may be withdrawn.

The bellows 37 have disposed in their inner folds vertically disposed flexible ribs or membranes 45, which add stiffness to the bellows.

It is to be observed that as the needles are forced into the meat to be cured through the movement of the supporting table relatively thereto, the closing casings 37 are by this relative movement forced upwardly permitting the needles to project into the meat and at the same time clearing those side apertures 27 which enter the meat. However, if the needles do not penetrate to the point where the highest aperture is closed by the meat proper, when the brine escapes therefrom and flows into the closing casing 37; and this casing can overflow into the reservoir 42 from which the brine may be pumped and reclaimed.

Due to the fact that the closing casings 37 surrounding the needles are relatively stiff, these casings also act as strippers to aid in forcing the meat off the needles as the meat is withdrawn from the needles.

The invention claimed is:

1. In an apparatus of the character described, in combination, a curing liquid pump apparatus, including a hollow needle having discharge apertures in its side wall at spaced intervals along its length and adapted to penetratingly enter the meat to be cured; means for forcing the curing liquid through said needle after penetration, and a flexible tubular closure member sealingly engaging the end of the needle beyond the discharge aperture nearest the point of said needle and having a discharge opening at its top; said flexible tubular member being collapsible with the penetration of the needle into the meat to be cured.

2. In an apparatus of the character described, in combination, a curing liquid pump apparatus, including a hollow needle having discharge apertures in its side walls at spaced intervals along its length and adapted to penetratingly enter the meat to be cured; means for forcing the curing liquid through said needle after penetration; a bellows shaped flexible tubular casing surrounding said needle having its lower end sealingly engaging the needle beyond the discharge aperture nearest the point of the needle and having a discharge opening at its top; said casing being collapsible along the length of the needle with the penetration of the needle into the meat to be cured.

3. In an apparatus of the character described, in combination, a curing liquid pump apparatus, including a hollow needle having discharge apertures in its side walls at spaced intervals along its length and adapted to penetratingly enter the meat to be cured; means for forcing the curing liquid through said needle after penetration, and a bellows shaped flexible tubular casing surrounding said needle having its lower end sealingly engaging the needle beyond the discharge point nearest the point of the needle and having a discharge opening at its top and interior; vertically disposed stiffening ribs disposed in the folds of said casing, said casing being collapsible along the length of the needle with the forcing of the needle into the meat to be cured.

4. A new curing device comprising a header, a hollow injecting needle supported from said header and having a plurality of discharge openings in its side walls at spaced intervals along its length, said header having on its under side a reservoir chamber adjacent the tops of said needles and having openings in the bottom wall thereof through which said needles are adapted to project; a flexible collapsible tubular closure member surrounding each of said needles communicating at its top through an opening in the bottom wall of the reservoir and having its lower end sealingly engaging the needle beyond the discharge opening nearest the point of the needle; said tubular closure member being collapsible along the length of the needle by the projection of the needle into the meat to be cured.

THOMAS A. D. JONES.
CORNELIUS E. KILBY.

REFERENCES CITED

The following references are of record in the file of this patent:

UNITED STATES PATENTS

| Number | Name | Date |
|---|---|---|
| 2,560,060 | Zwosta | July 10, 1951 |

FOREIGN PATENTS

| Number | Country | Date |
|---|---|---|
| 502,486 | Germany | July 11, 1930 |